United States Patent Office 3,364,144
Patented Jan. 16, 1968

3,364,144
LAMELLATED DIELECTRIC OF MIXED
BISMUTH OXIDES
Charles F. Pulvari, 2014 Taylor St. NE.,
Washington, D.C. 20018
No Drawing. Filed Oct. 24, 1963, Ser. No. 318,485
7 Claims. (Cl. 252—62.9)

The present invention relates to a new substance having ferroelectric, ferrielectric, piezoelectric and, within a wide temperature region, nearly constant dielectric properties and a very high break down voltage as compared to previously known ceramic bodies, and to electrical devices utilizing such substances.

For high dielectric constant bodies heretofore ceramic type materials were used. It is known that such ceramic bodies possess a relatively low breakdown voltage and in most cases a quite strong temperature dependent dielectric constant.

According to this invention, it was visualized that if a dielectric body is formed incorporating crystalline flakes or small platelets of mixed bismuth oxides bonded with a high dielectric constant inorganic binder which may also exhibit nonlinear ferroelectric, ferrielectric, or piezoelectric properties, such as, for example, a bismuth borate glass, or a mixed bismuth oxide having a lower melting point than the flakes such as, for example, the compound $Ba_2Bi_4Ti_5O_{18}$, which later also exhibits ferroelectric properties. The overlapping flakes form sort of a bonded lamellated structure in contrast to a grain structured ceramic body and a high dielectric, high break down, and, within a wide temperature region, nearly constant dielectric properties are obtained. The multiplicity of flakes eliminates coincidence of flaws or holes which could cause low break down voltage.

The bonded laminated crystalline flakes as a high dielectric body represent a dramatic improvement over all dielectric properties when compared with the heretofore used grain structured ceramic dielectric body.

It is the first time that a dielectric body consisting of bonded, laminated, crystalline platelets is proposed with dramatically improved dielectric properties where both the binder as well as the crystalline flakes are non-linear, high dielectric materials and possess ferri- or ferroelectric properties.

The class of "mixed bismuth oxide crystals with layered crystal structure" specifies a large number of compositions containing bismuth and having the common property to be of a layered structure and are known as quoted. Such crystals have been produced by Bengt Aurivillius, G. A. Smolenskii and others. A simple form of such crystal is $Bi_4Ti_3O_{12}$ produced by melting $Bi_2O_3$ and $TiO_2$ in a crucible at 1200° C. Upon cooling, the crystals grow in small flakes or platelets separated by layers of $Bi_2O_3$. As grown, the material is not suitable as a dielectric. The excess bismuth oxide must be removed and the material separated into flakes. When the excess $Bi_2O_3$ is dissolved with a strong mineral acid solution clear flakes or sheet-like crystals are separated from the intervening $Bi_2O_3$ layers. The crystal flakes are very thin. The size of flakes varies considerably and typical sizes between 1 and 100 mm.[2] are readily obtained. The thickness of these flakes varies also within a wide region, and 0.02 to 0.1 mm. may be regarded as typical although both larger and smaller flakes may be present. Slightly grayish clear crystals are obtained in larger and smaller sheet-like but random size. The individual flakes exhibit ferroelectric and piezoelectric properties, have a Curie temperature of ~675° C. and a saturation polarization of about 3 m. coul/cm.[2]; the piezoelectric constant $d_{33}$ was found to be ~$20 \times 10^{-12}$ coul/newton. The dielectric constant of this material is nearly constant up to about 300° C. and is in the order of 180 at 25° C.

Besides the already mentioned $Bi_4Ti_3O_{12}$ structure, it is possible to synthetize a large family of "mixed bismuth oxides with layered structure" which may be equally well utilized as a basic material for this invention. Technical articles describing these oxides are:

"Mixed bismuth oxides with layer lattices, II. Structure of $Bi_4Ti_3O_{12}$," by Bengt Aurivillius, Arkiv for Kemi Band 1 No. 58, Sept. 15, 1949.

"Mixed bismuth oxides with layer lattices. I. The structure type of $CaNb_2Bi_2O_9$," by Bengt Aurivillius, Arkiv for Kemi Band 1 No. 54, Sept. 15, 1949.

"The structure of $Bi_2NbO_5F$ and isomorphous compounds," by Bengt Aurivillius, Arkiv for Kemi Band 5 No. 4, May 1952.

"Mixed Oxides With Layer Lattices, III. Structure of $BaBi_4Ti_4O_{15}$," by Bengt Aurivillius, Arkiv for Kemi Band 2 No. 37, May 24, 1950.

"Some Properties of Bismuth Perovskites," MIT Technical Report 160, March 1961.

"Crystal Chemistry of Mixed Bismuth Oxides with Layer-Type Structure," E. C. Subbarao, Am. Ceramic Soc., April 1962.

The ferroelectric and piezoelectric properties can be modified by some additions, or substitutions, for example Lanthanum decreases the coercivity and threshold switching field of the material without influencing appreciably the other dielectric properties. Yttrium, and in a greater extent zirconium, increase the coercivity and threshold switching field. Generalized formulas for the various type of structures are presented in the six quoted publications. As an example, for a family of mixed bismuth oxides the following general formula is presented:

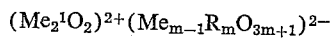

$$(Me_2{}^1O_2)^{2+}(Me_{m-1}R_mO_{3m+1})^{2-}$$

Me and $Me^1$ = ions of appropriate size and valency. $R = Ti^{4+}$, $Nb^{5+}$, $Ta^{5+}$, etc., either singly or in combination. $m = 2, 3, 4$, etc. One member of this family, for example, is $PbBi_2Nb_2O_9$. In addition, inert ingredients and impurities may be present in minor amounts, 0 to 10%.

It is, therefore, the general object of this invention to produce a novel dielectric body comprising these sheet-like crystals bonded with a high dielectric constant binder such as, for example, a bismuth borate glass or a mixed bismuth oxide having a lower melting point than the flakes such as, for example, the compound $Ba_2Bi_4Ti_5O_{19}$ so as to obtain a readily shapable and workable material which exhibits dielectric, ferroelectric and piezoelectric properties suited for the production of electrical devices.

Another object of the present invention is the provision of such a material in which the inorganic glassy bonding materials are bithmuth oxide glasses, for example, the glass systems $Bi_2O_3$—$B_2O_3$ or $Bi_2O_3$—$TiO_2$—$B_2O_3$ or $Bi_2O_3$—$TiO_2$—$SiO_2$, etc. The dielectric constant values of these glasses were found to be as high as 40 with a very low loss factor of about 0.002 into the megacycle region. The dielectric constant is essentially independent of frequency up to $2.5 \times 10^6$ c.p.s., and the temperature dependence of this glass is also a constant up to about 300° C. One of the technical articles describing some of these bismuth oxide glasses is "The System $Bi_2O_3$—$B_2O_3$" by Ernest M. Levin and Clyde L. McDanniel, Journal A. Ceramic Soc., Aug. 1, 1962. This bonding material forms an intimate contact with the layered mixed bismuth oxide crystals, and is very compatible with said crystals. This glass has also non-linear properties and the combined glass bonded crystal structure yields a dielectric body having a dielectric constant of about 100, low loss ($tng\delta = 0.0015$) and about one order of magnitude higher break down voltage than ordinary ceramic bodies thus permitting to fabricate superior quality capacitors with heretofore not attained electrical qualities. In general, any high dielectric glass can be used as a bonding material for producing the combined glass bonded crystal structure.

Still another object of the present invention is the provision of a new and improved method for inorganically bonding laminated crystalline platelets of mixed bismuth oxides wherein it becomes unnecessary to preliminarily organically bond said platelets prior to inorganically bonding same, and the bonding glass is partially formed of the crystalline material surface itself since bismuth oxide crystal surfaces when reacted with boron oxide form a thin, glassy surface on the crystals apt for bonding purposes.

Accordingly, in another modification of this invention a boron gas treatment is used at high temperature to form the necessary glassy layer on the crystal platelets to become apt for bonding.

For example, a preferred gas for this purpose is a boron chloride gas which can be mixed with a neutral gas such as nitrogen or a noble gas. When the platelets are heated to about 600 to 900° C. in a boron chloride gas atmosphere, the gas reacts with the surface of the flakes to form a bismuth boron glass layer. The so treated crystalline mixed bismuth particles are then suited for pressing or hot pressing, and a final heat treatment.

In another modification of the present invention the high dielectric inorganic bonding material consists essentially of a mixed bismuth oxide having a lower melting point than the laminated crystalline platelets of mixed bismuth oxides such as, for example, $Ba_2Bi_4Ti_5O_{12}$ which compound can be synthetized by reacting $Bi_4Ti_3O_{12}$ and $BaTiO_3$ in a 1:2 mole ratio.

This improved piezoelectric element may be used in the usual manner as an electromechanical transducer, where it is desired to convert variations of electrical current or potential into corresponding mechanical variations, or vice versa, as in supersonic sound generators, microphones, telephone receivers, phonograph pickups, piezoelectric relays and similar devices. In such devices, the usual mechanical means are supplied for either transmitting mechanical energy to the body as in microphones and phonograph pickups or utilizing the mechanical energy generated in the body, as in supersonic generators, telephone receivers and relays.

When this novel dielectric body is used as an electric condenser, the device makes use of the high dielectric constant, temperature and frequency stability, low loss and high break down properties which were heretofore not available in ordinary ferroelectric ceramic materials. When this device is used as a piezoelectric element it may be operated while subjected to a constant, direct current biasing field or may be in a suitable manner permanently polarized.

The above and other objects, characteristics and features of the present invention will be more fully understood from the following detailed description.

The basic material for this novel dielectric body is mixed bismuth oxide crystals of layered structure in the form of flakes or platelets which are, for example, arranged in a reconstituted sheet. For example, such a sheet may be made by breaking up a chunk of mixed bismuth oxide crystals such as $Bi_4Ti_3O_{12}$ as grown in a crucible into a multiplicity of small platelets, suspending and washing the platelets in a mineral acid for a few hours in order to clean them from the excess $Bi_2O_3$. The so cleaned crystalline platelets are washed in a liquid such as water and finally suspended again in a liquid medium containing dissolved boric acid, and laying the suspended platelets down in a sheet or kneaded with an additional volatile and ash free burning binder into a plastic mass ready for extrusion. Such a sheet is made by laying down a huge multiplicity of small platelets of bismuth oxide crystalline material by any of the known methods. One method of so laying the platelets down may be that of conventional paper making apparatus such as a Fourdrinier machine.

The so produced reconstituted sheet may be placed and immediately formed on a stainless steel screen for more convenient handling purposes and placed in a bath having an inorganic binder solution. Preferably, the binder is a boric acid in solution or with some volatile or ashless organic added to the reconstituted crystalline platelets sheet, which, being porous, will absorb the binder solution. This impregnated reconstituted sheet may be dried and ready for shaping by placing it in a die and compressing it or hot pressing it. After the drying process the material may receive a preliminary heat treatment so as to cause the boric acid to change over into boric oxide and react with the bismuth oxide crystal surfaces forming a thin, glassy layer for bonding purposes. It is, however, possible to utilize a finely distributed $Bi_2O_3$—$B_2O_3$ etc. glass powder as a binder in which latter case the glass powder may be mixed with the platelets and simultaneously deposited with the crystal flakes as the reconstituted layer is produced.

Instead of a high dielectric glass powder a finely distributed $Ba_2Bi_4Ti_5O_{18}$ high dielectric mixed bismuth oxide may also be utilized as a binder. In this case this binder is made apt for bonding purposes by preparing it of such a composition that it possesses a lower melting point than the laminated crystalline platelets of mixed bismuth oxides to be bonded. The pulverized binder may be mixed with the crystal flakes as the reconstituted layer is produced.

It has been found that to obtain a good shaping property the addition of a volatile and after heating ash free binder is of advantage. After shaping, the sheet is subjected to a temperature preferably between 110° C. and 150° C. for a time sufficient to eliminate all liquid residuals and obtain a sufficient bond and density so that the sheet or body can be handled for further processing without becoming broken. In this state, the material is ready for shaping by compression or hot pressing into tubes, three dimensional bodies, etc.

In order to obtain a strong homogeneously bonded body, a final heat treatment is needed which may be simultaneously carried out with the pressing procedure. The temperature for this final treatment should be within 620 to 900° C. for a period of time sufficient to obtain a homogeneous heat distribution throughout the body. The time of heat treatment varies with the size of the body and temperature employed.

After hot pressing or pressing and heat treated the dielectric body is rigid and grayish and exhibits unique and outstanding electrical properties as discussed before.

Various modifications in partial heat treatment, shaping, die casting, and pressing between foils is possible depending on the manufacturing schedule desired.

When this novel dielectric body is used as a condenser, electrodes in the desired configuration are formed on its surfaces by either of the known methods; for example, vacuum evaporation or by firing silver paste electrodes.

When the devices are used as a piezoelectric element, a direct current biasing field may be established by maintaining a direct current voltage across the electrodes while the device is in use. A similar result can be achieved by subjecting the dielectric body to a high direct current potential gradient for a substantial period of time prior to use. Upon removal of this direct current potential, a residual polarization remains in the body which can be used as a source of the requisite direct current field without the use of an externally applied direct current potential. The residual polarization may be obtained more effectively if the bdy is heated to a temperature above the Curie temperature and is then allowed to cool to room temperature under a high direct current potential gradient.

Piezoelectric bodies of this type due to the low loss and polarization permit the fabrication of high frequency resonators, such as required in intermediate frequency I.F. couplers between transistor stages.

While several forms of the present invention have been shown and a number of modifications suggested, it will be understood that changes and modifications may be made therein without departing from the spirit and scope of the present invention.

What is claimed as new is:

1. A lamellated dielectric body consisting essentially of a plurality of platelets in overlapping relation pressed into contact with each other and bonded together by an intervening bonding medium, the platelets being individual crystals of mixed bismuth oxide, each crystal having a layered crystal structure, the bonding medium consisting essentially of a high dielectric constant material having a lower melting point than the platelets fused to the platelets.

2. The dielectric body of claim 1 in which the bonding medium consists essentially of a bismuth oxide glass.

3. The dielectric body of claim 1 in which the bonding medium consists essentially of a bismuth barium titanate dielectric.

4. An intermediate element for the manufacture of dielectric bodies consisting essentially of an individual crystal flake of mixed bismuth oxide which has layered crystal structure having fused on its external surfaces a thin coating of a bismuth oxide glass having a melting point less than the melting point of the crystal flake.

5. A transducer element consisting essentially of the polarized body of claim 1.

6. A transducer element consisting essentially of the polarized body of claim 2.

7. A transducer element consisting essentially of the polarized body of claim 3.

References Cited

UNITED STATES PATENTS

| 2,538,554 | 1/1951 | Cherry | 252—62.9 |
| 2,870,030 | 1/1959 | Stradley et al. | 106—47 |

FOREIGN PATENTS

| 860,019 | 2/1961 | Great Britain. |

OTHER REFERENCES

Aurivillius, Arkiv for Kemi, Band I No. 54, Sept. 15, 1949 pp. 460–80.

Subbarao, Crystal Chemistry of Mixed Bismuth Oxides with Layer-type Structure, Journal of the American Ceramic Society, vol. 45, April 1962, pp. 166–169.

TOBIAS E. LEVOW, *Primary Examiner.*

R. D. EDMONDS, *Examiner.*